June 24, 1924.  1,498,630
J. O. JENSEN
APPARATUS FOR COOLING COMMINUTED SOLID MATERIAL
Filed June 8, 1921  2 Sheets-Sheet 2
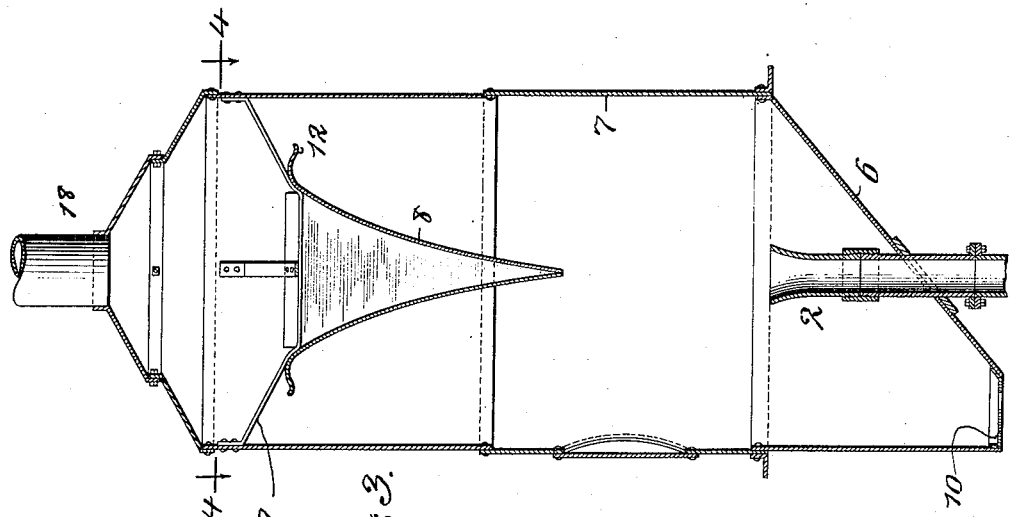
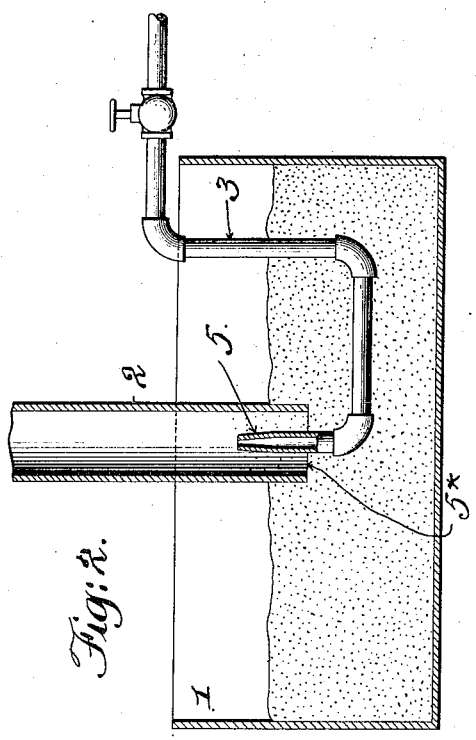
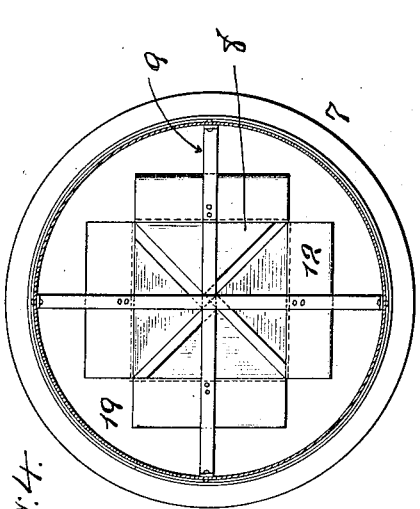
Inventor
Jens O. Jensen
By his Attorney Patented June 24, 1924.

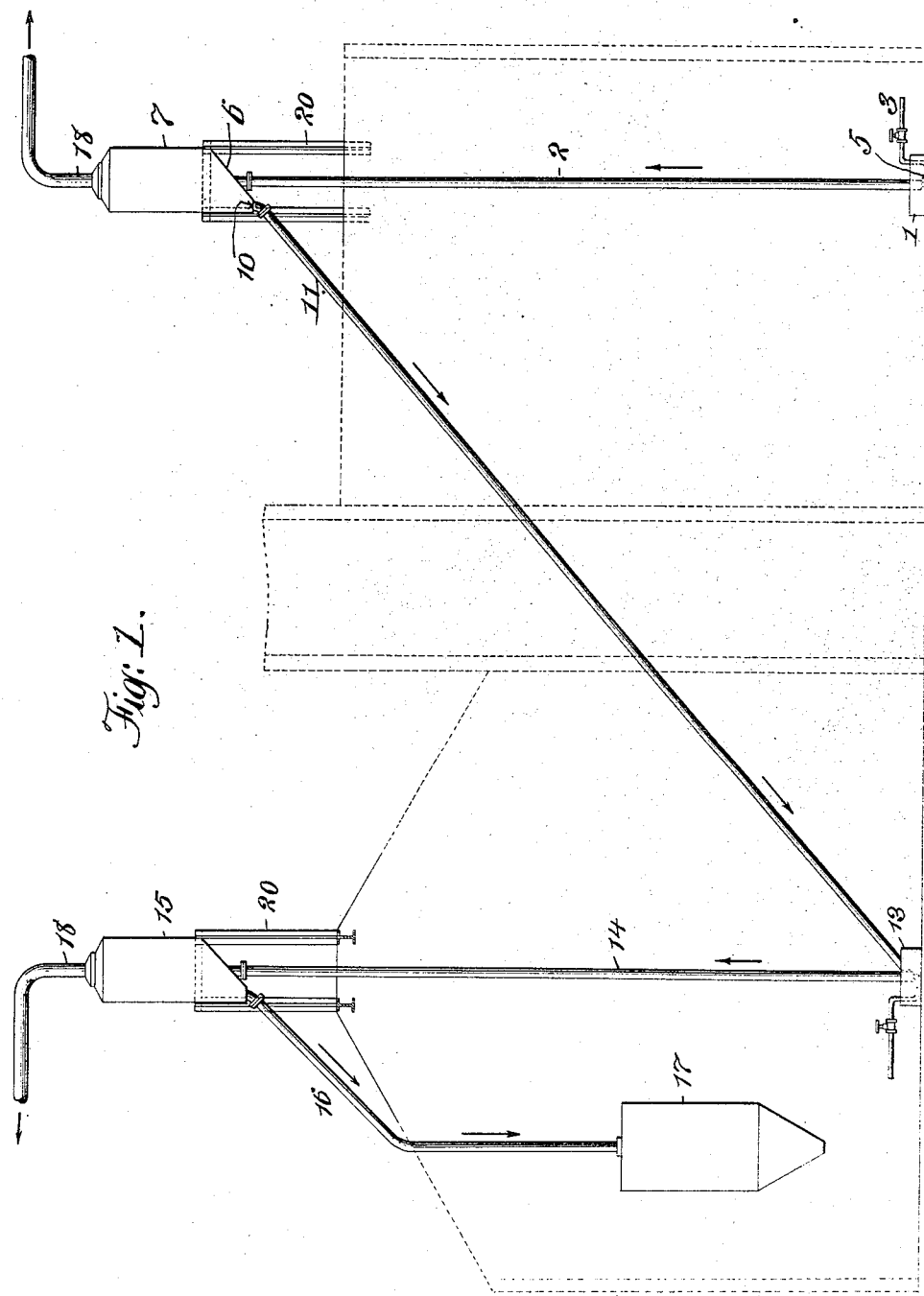

1,498,630

UNITED STATES PATENT OFFICE.

JENS O. JENSEN, OF BALTIMORE, MARYLAND.

APPARATUS FOR COOLING COMMINUTED SOLID MATERIAL.

Application filed June 8, 1921. Serial No. 476,090.

*To all whom it may concern:*

Be it known that I, JENS O. JENSEN, a subject of the King of Denmark, residing at Baltimore, State of Maryland, have invented a certain new and useful Improvement in Apparatus for Cooling Comminuted Solid Material, of which the following is a specification.

Comminuted clay, or as more particularly termed "fuller's earth," is used for the filtering of oils. After such use and to prepare the clay again for filtering, it is commonly heated in kilns to temperatures of 600° Fahr. or over. Before reemployment it is desirable to cool the heated clay down to between 100° and 110° Fahr. This has hitherto been done chiefly in three ways: by exposure to the air while held in suitable containing vessels; by similar exposure while caused to descend a series of shelves or steps, and by placing the clay in long rotating inclined cylinders cooled by water externally applied. All of these operations present economical difficulties, which are noted in some detail hereinafter. The present invention is a cooling apparatus in which these difficulties are overcome, and the cost of handling and time required to cool the clay materially reduced.

In the accompanying drawings—

Fig. 1 is an elevation of my clay-cooling apparatus. Fig. 2 shows in enlarged section the clay receptacle, the up-flow conduit and the air-blast nozzle disposed in the lower end of said conduit. Fig. 3 is a vertical section, showing the upper clay receptacle and the upper end of the up-flow conduit entering said receptacle through the inclined portion of the bottom thereof.
Fig. 4 is a horizontal section on the line 4, 4 of Fig. 3. Fig. 5 is a partial view of the under side of the bottom of said receptacle, showing the place of attachment of the down-flow conduit leading from said receptacle.

Similar numbers of reference indicate like parts.

The hot clay as it comes from the kiln is placed in the receptacle 1, into which enters the lower end of the vertical up-flow conduit 2. Also entering said receptacle is a pipe 3 leading to any suitable source of air under pressure and having at its end the nozzle 5 which is disposed vertically within conduit 2. The diameter of the nozzle is much less than the diameter of the conduit, so that a clearance 5* exists between the nozzle and the conduit wall, through which clearance the air blast from the nozzle draws the external cool atmosphere into the conduit. The particles of clay are entrained by the air jet from nozzle 5, and are so carried upward through the conduit 2 which at its upper end passes through the inclined portion 6 of the bottom of receptacle 7. The upper end of conduit 2 is preferably flared, as shown in Fig. 3. The clay particles continuing their upward motion impinge upon a baffle, here the sides of the inverted pyramidal deflector 8 which is supported by four brace-rods 9 secured to the deflector walls, and by said deflector are directed downward upon the inclined portion 6 of the receptacle bottom, and slide by gravity thereon to the flat and lower portion 10 of said bottom which communicates with the down-flow conduit 11. The upper edges of the deflector are preferably curved over, as shown at 12.

The clay particles then move down conduit 11 by gravity to a receptacle 13, similar to receptacle 1, from which they are elevated by an air jet, as before, through a second up-flow pipe 14 to receptacle 15, constructed similarly to receptacle 7, whence they pass finally by gravity through down-flow conduit 16 to any suitable container 17, whence the now cooled clay is removed as needed.

An apparatus, as above described, having substantially the following dimensions has been built by me and is now in successful practical operation. With an air pressure of forty pounds per square inch, I make the up-flow conduits of about forty-five feet lift. The diameter of the air nozzle 5 is five-eighths of an inch. The conduits are of iron or steel and six inches in diameter. The upper receptacles 7 and 15 are each ten feet in height by five feet in diameter. The deflector pyramid 8 is thirty inches in diameter and four feet from apex to base. Where the clay enters from the kiln at about 500° Fahr., its temperature on leaving upper receptacle 7 is about 200° Fahr., and on leaving receptacle 15, about 105° Fahr.

Especial attention is now directed to the fact that the quick cooling of the clay is effected not only by radiation while traversing the confining conduits and by the cold air drawn in by the air jet through clearance 5* around the nozzle, but by the expansion of the air blast in which the particles are entrained and which rapidly absorbs their heat.

It is important that the longitudinal central axes of the nozzle 5 and the deflector pyramid 8 should be placed to coincide with the longitudinal central axis of the up-flow conduit; for if the jet be inclined at an angle, so that the clay particles driven by the powerful air current impact strongly upon the inner surface of the up-flow conduit, they will act like a sand blast to abrade the conduit wall.

When the particles enter the enlarged space in receptacle 7 their velocity is, of course, decreased, so that when they strike the deflector 8 their momentum is destroyed by the impact and they fall by gravity first upon the inclined portion 6 of the bottom of the receptacle 7 and then through the conduit 11. As the impelling force is then small, any abrasion of said conduit 11 is negligible. The inclination of conduit 11 should be no more than enough to determine the descent of the clay therein by gravity.

Besides cooling the clay it is desirable to remove such part of it as may have become too finely pulverized for filtering purposes, or, in other words, the dust. This I accomplish by providing outlet ducts 18 in receptacles 7 and 15, which ducts are disposed above the deflectors. While the particles of suitable size for filtering are, as already described, thrown back by the deflector, the light dust is carried onward by the air blast, passing through the clearances 19 between the deflector and the receptacle walls, and so to the outlet.

In Fig. 1, I have shown the apparatus installed in buildings, indicated by dotted lines, with the upper receptacles supported by posts 20 above the roofs, but any other supporting means can, of course, be chosen.

As compared with the cooling means already noted as in the prior art, I find by practical experience with them and by actual tests under practical working conditions, that my present invention offers the following advantages.

Where the clay is exposed to the atmosphere in containers, each container weighs some three hundred pounds when full. To fill them and transport them requires a great deal of hand labor. They occupy much floor space. To cool the clay in them from 500° Fahr. to between 100° to 105° Fahr. requires about one week, during which time all of the clay is "dead"—that is, out of use.

Where the clay is caused to descend steps or shelves while exposed to the atmosphere, requires elevating apparatus to carry the material to the highest shelf, its descent by gravity is slow, and the use of fans to project air currents upon the descending thin flow between the steps tends to scatter the particles. The cooling time under these conditions is about twenty-four hours.

The rotary cooling cylinders employed are about sixty feet in length by five feet in diameter, and are set inclined so that the clay introduced at the upper end descends by gravity to the outlet. They weigh from six to eight tons, and their speed of rotation must be narrowly determined, for if they rotate too fast the cooling is not effectively done. A further and very serious trouble arises from the fact that the application of cold water to the exterior of the cylinder causes an internal sweating and the consequent production of moisture which, mingling with the clay, prevents its absorbing the oil during the filtering operation, for which dry clay is necessary. The same difficulty occurs with the clay when exposed in containers, if it is attempted to cool these by external refrigerants.

In the practice of my invention, no handling of the clay is required after it is placed in the first receptacle, from which it is entrained by the air jet. No sweating can occur in any receptacle or conduit. No attendance is required for lubrication, which is an important matter when the ponderous rotating cylinders are used. The apparatus can be installed in any convenient place to which the compressed air for the nozzle can be conducted. And, finally, the actual period of preparing the clay for filtering purposes, beginning with its placing in the heating kiln and ending with its being cooled and ready for use, need not exceed one hour.

I claim:

1. Apparatus for cooling comminuted solid material, comprising a receptacle to receive said material open to access of air, an upwardly extending conduit communicating at its lower end with said receptacle, an injector nozzle for delivering a blast of compressed air into said lower end to entrain said material and cause the same to traverse said conduit, an elevated receptacle having a lower end through which the upper end of said conduit passes, the elevation of said receptacle being adapted to provide a substantial cooling effect for the material by the expansion of the air reaching the same, a discharge outlet for said material disposed at the lower end of the elevated receptacle, an inclined baffle inside said elevated receptacle intercepting the delivery from the upper end of said conduit and receiving the impact of the particles of comminuted material entering from said conduit and diverting the same toward said lower end and discharge outlet, and an air and dust exit from said elevated receptacle.

2. Apparatus for cooling comminuted solid material, comprising a receptacle for said material, a vertical conduit communicating at its lower end with said receptacle, means for delivering an air jet, at at least 40 lbs. pressure into said lower end to entrain said material and cause the same to ascend said conduit, a receptacle receiving said material from said conduit and having a discharge outlet at the lower end thereof, and a baffle of substantially inverted pyramidal shape disposed in said last-named receptacle above said outlet and above the upper end of said conduit, the central longitudinal axes of said jet and said pyramidal baffle coinciding with the central longitudinal axis of said conduit.

3. Apparatus for cooling comminuted solid material, comprising a receptacle to receive said material, an upwardly extending conduit communicating at its lower end with said receptacle, means for delivering a blast of compressed air into said lower end to entrain said material and to cause the same to ascend said conduit, a chamber receiving said material from said conduit and having separate discharge outlets for air and for said material, a conduit downwardly inclined, a second receptacle conducting said material as received and delivering the same to an upstanding conduit communicating at its lower end with said second receptacle, means for delivering an air blast into said upstanding conduit to entrain and elevate said material, a second receiving chamber receiving the material from said upstanding conduit and separate outlets for air and said material from said second chamber.

In testimony whereof I have affixed my signature in presence of two witnesses.

JENS O. JENSEN.

Witnesses:
GERTRUDE T. PORTER,
MAY T. MCGARRY.